Jan. 24, 1967     J. S. COBB, JR     3,299,760
COOPERATING GUIDE MEANS AND RECIPROCABLE TOOL HOLDER
Filed Jan. 5, 1965
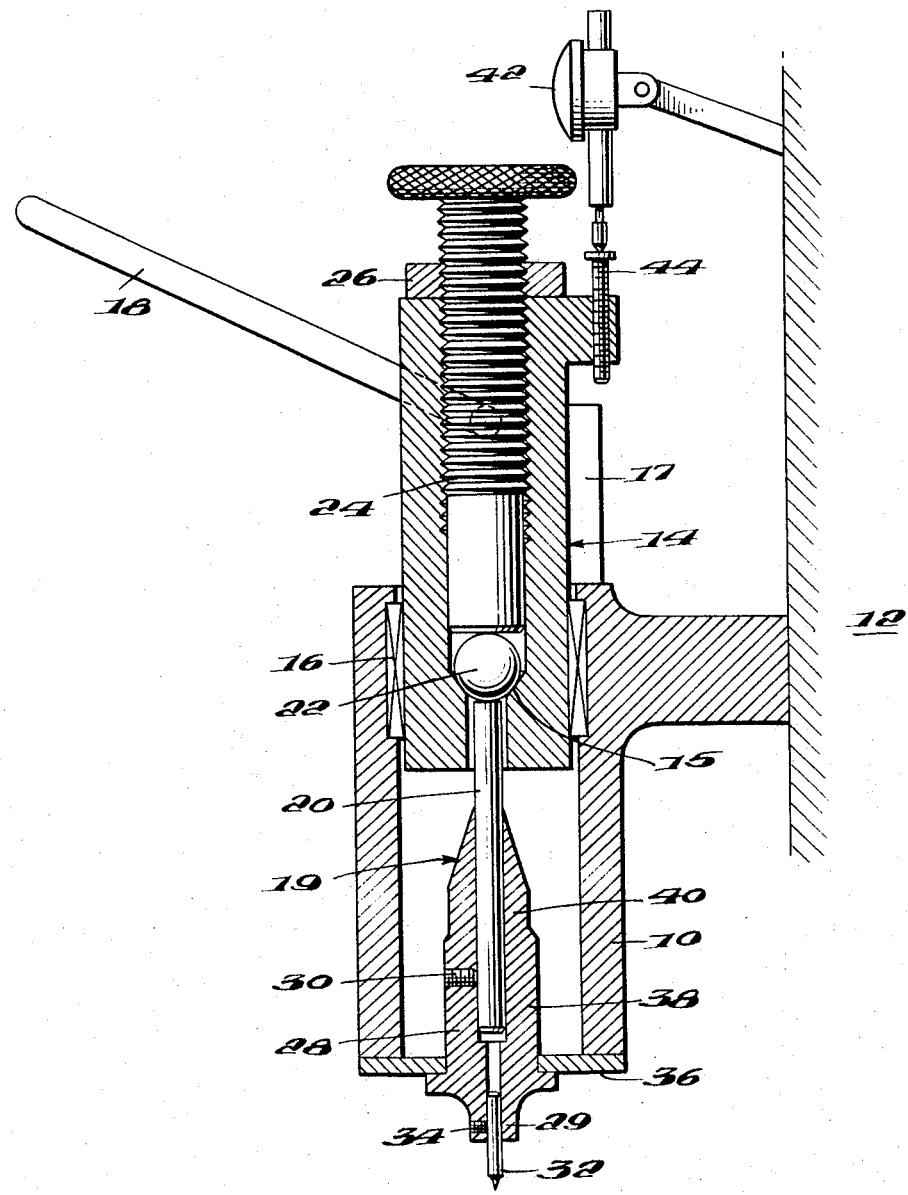

United States Patent Office 3,299,760
Patented Jan. 24, 1967

3,299,760
COOPERATING GUIDE MEANS AND RECIPROCABLE TOOL HOLDER
James Stanley Cobb, Jr., Martinsville, Va., assignor to E. I. du Pont de Nemours and Company, Wilmington, Del., a corporation of Delaware
Filed Jan. 5, 1965, Ser. No. 423,510
3 Claims. (Cl. 83—635)

This invention relates generally to the manufacture of spinnerets of the type which are used in the production of filamentary structures from viscous organic materials and, more particularly, to improvements in the machinery with which minute capillary extrusion holes are fabricated in a spinneret plate.

It is known that the fabrication of spinneret holes involves multiple machining steps such as punching, drilling and broaching, and that various difficulties are encountered in aligning the tools with the work that has already been accomplished in preceding steps. When the tools are aligned perfectly, a pattern of uniform symmetrical holes is obtained. However, when no so aligned, there is always a likelihood that they will be damaged or that the resulting holes will be imperfect. These imperfections usually lead to the extrusion of nonuniform filaments.

The general objective of the present invention is to provide machinery modifications which facilitate the quick and reliable production of uniform spinneret holes by relatively unskilled operators. A more specific objective is to provide for both pivotal and rotational self-alignment of a punch tool.

These worthwhile objectives have been achieved with a punch press which includes a stationary guide block having a tool holder mounted therein for sliding movement through a working stroke. The punch tool has a ball at one of its ends and a punch member at its opposite end. A socket on the tool holder mounts the ball for pivotal and rotational movements. However, the block and tool are provided with parts which cooperate to prevent pivotal movements during an initial portion of the working stroke.

Other objectives will be apparent from the following specification wherein reference is made to the accompanying sectional illustration of a preferred embodiment.

The term "punch tool," as used herein, is intended to encompass the variety of tools which are useful in the fabrication of holes, passages, indentations and the like, and which are adapted for attachment to the chuck of a punch press. Where this term is used, there is no intention of limiting the description or utility of the disclosed improvements and advantages to a punching step as distinguished from such machining steps as stamping, coining and the like.

As illustrated, the modified punch press of the present invention includes a guide block in the form of a stationary housing 10 mounted to a fixed base 12 and a movable housing or tool holder 14 telescoped within a bearing 16. Reciprocatory motion of holder 14 is accomplished by a typical rack and pinion arrangement which is located in a case 17 and is operated by a lever 18. Elongated punch tool 19 includes a shaft 20 having a ball 22 at its upper end. A beveled socket 15 in holder 14 mounts ball 22 for pivotal and rotational movements. Adjusting screw 24 threaded into the upper end of holder 14 controls the axial movement of ball 22. Clearance between the pin end of adjusting screw 24 and the ball is such as to permit approximately 0.0001 to 0.001 inch vertical movement of shaft 20. Adjusting screw 24 is held in position by lock nut 26.

Punch tool 19 also includes a guide sleeve 28 fitted on the lower extremity of shaft 20. Sleeve 28 extends substantially through the length of shaft 20 and has an extension 29 in which a punch member 32 of tungsten tool steel or other suitable material is mounted. Sleeve 28 and punch member 32 are held in place by set screws 30, 34. A centering plate 36 extends laterally from and is attached to guide block 10 by screws, not shown. Plate 36 has a through hole which receives sleeve 28 and is in coaxial relationship with tool holder 14. When the latter is at the top of its stroke, punch tool 19 is held on the same axis because of the very small clearance between the hole in centering plate 36 and a larger working diameter 38 of sleeve 28. As holder 14 and tool 19 are moved downwardly, a smaller working portion 40 reaches centering plate 36, leaving a clearance which permits limited pivotal movement of ball 22, shaft 20 and punch member 32. Thus, a spinneret plate need not be positioned with extreme accuracy since punch member 32 automatically aligns itself. Consequently, fewer punches are broken.

Frequently, it is desirable to measure the vertical motion of tool 19 during a punching step or the depth of penetration achieved in a previous step. Either can be measured with a dial indicator 42 which is mounted to the fixed base 12 in a conventional manner and is contacted by a position screw 44. Other arrangements, of course, can be used to make these measurements.

Typically, the illustrated punch press is used in making odd-shaped spinneret capillaries. One or more drilling steps are used to form the lead-in hole in a spinneret plate of stainless steel or other suitable material. As is well known, a number of capillaries are formed in a single plate. A forming punch is used to shape the bottom of the drilled hole, then a final sizing punch is used to form the capillary. Frequently, the forming and sizing steps leave nubs or protuberances on the face of the spinneret and these, of course, are removed by normal finishing steps. The machinery of this invention is used in the final sizing step. For example, in the formation of a trilobal cross section, the forming punch makes three indentations in the bottom of a lead-in hole. It is essential that the final sizing punch be accurately aligned with the indentations left by this punch. This requires both axial and rotational alignment. With the modified punch press of this invention, shaft 20 is free to rotate and can also pivot to the limited extent permitted by the reduced diameter of sleeve portion 40, i.e., as lever 18 is depressed by the operator, punch member 32 enters the lead-in hole and centers itself both transversely and rotationally.

In a specific use embodiment, the effective length of shaft 20 and punch member 32 is four inches. Shaft 20 is permitted to pivot or deflect 0.015 inch, an annular deflection of less than twelve minutes, i.e., less than a fifth of a degree. This extremely small angle is sufficient for the purpose of transverse self-alignment and does not cause any problems in the capillary.

A usual parameter in determining suitability of round spinneret capillaries is the ratio of depth or length to diameter. With odd cross section capillaries, this is the ratio of depth to width of an arm. In the past, only a ratio of one or slightly greater has been practicable, although higher ratios are desirable from the standpoint of improved yarn product. Capillary depths have been limited by punch breakage due in part to punch rigidity. Using the improved punch tool of this invention, it has been possible to produce odd-shaped capillaries having a depth to arm width ratio in the order of two to one. Furthermore, the tool is easier to use and requires less skill since it is not essential that the operator do the alignment. In addition, there is less punch breakage and damage to the spinneret. All of this provides an improved spinneret at less expense. In the latter connection, it should be noted that the illustrated punch press is also useful in the fabrication of round capillaries.

Instead of tubular housing 10, the guide block could obviously be in the form of spaced ways or tracks. Similarly, punch member 32 could be mounted directly in an extension of shaft 20 rather than in the extension 29 of sleeve 28. Other changes and modifications may be made and the illustrated machinery may be used in many operations analogous to those specifically disclosed herein without departing from the spirit of the present invention which is therefore intended to be limited only by the scope of the appended claims.

Having thus described the invention, what is claimed as new and desired to be secured by Letters Patent is:

1. In a punch press including a stationary guide block and a tool holder mounted therein for sliding movement through a working stroke, a punch tool comprising a shaft, a ball at one end of the shaft and a punch member at its opposite end, said holder having a socket mounting said ball for pivotal and rotational movements, said block and said tool having cooperable means thereon for guiding and thereby preventing pivotal movement of the tool during the initial portion of said working stroke.

2. A punch press comprising: a stationary guide block; a tool holder mounted in said block for sliding movement through a working stroke, said holder being provided with a socket; a shaft having a ball located at one of its ends and mounted in said socket for pivotal and rotational movements; a sleeve fitted on and extending substantially through the length of said shaft, said sleeve also having an extension projecting beyond said shaft at its opposite end; a punch member mounted in and projecting from said extension in coaxial alignment with said shaft; and a centering plate extending laterally from said guide block, said plate having an opening within which said sleeve is slidably engaged during the initial portion of said working stroke, said sleeve having reduced peripheral dimensions in a length corresponding to the remainder of said stroke whereby to facilitate limited pivotal movement of said tool.

3. The punch press of claim 2 wherein said sleeve and the opening in said plate are round and said sleeve is of reduced diameter in the length corresponding to the remainder of said stroke.

References Cited by the Examiner

UNITED STATES PATENTS

| | | | |
|---|---|---|---|
| 353,192 | 11/1886 | White | 72—465 |
| 1,300,428 | 4/1919 | Lowenstein. | |
| 2,152,958 | 4/1939 | Freeman | 83—629 X |
| 2,441,830 | 5/1948 | Miller | 72—465 |
| 2,475,385 | 7/1949 | Frisco | 279—16 |
| 2,643,142 | 6/1953 | Stellin | 10—7 X |

ANDREW R. JUHASZ, *Primary Examiner.*